US008195432B2

(12) United States Patent
Herz et al.

(10) Patent No.: US 8,195,432 B2
(45) Date of Patent: Jun. 5, 2012

(54) MEDIA CAPTURE SYSTEM, METHOD, AND COMPUTER PROGRAM PRODUCT FOR ASSESSING PROCESSING CAPABILITIES UTILIZING CASCADED MEMORIES

(75) Inventors: William S. Herz, Hayward, CA (US); Jihua Yu, Shenzhen (CN); Hao Tang, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 621 days.

(21) Appl. No.: 12/274,202

(22) Filed: Nov. 19, 2008

(65) Prior Publication Data
US 2010/0088068 A1    Apr. 8, 2010

(30) Foreign Application Priority Data

Oct. 6, 2008   (CN) .......................... 2008 1 0161685

(51) Int. Cl.
*G06F 15/00* (2006.01)
(52) U.S. Cl. ........ 702/186; 422/68.1; 712/210; 725/109
(58) Field of Classification Search .................. 702/186, 702/189, 190, 193; 386/232, 243; 701/33; 713/164, 165; 725/186, 109; 712/1, 28, 712/210; 422/68.1
See application file for complete search history.

(56) References Cited

U.S. PATENT DOCUMENTS

| | | | | | |
|---|---|---|---|---|---|
| 5,822,603 | A | * | 10/1998 | Hansen et al. | 712/210 |
| 7,803,322 | B2 | * | 9/2010 | Borich et al. | 422/68.1 |
| 2008/0201751 | A1 | * | 8/2008 | Ahmed et al. | 725/109 |

OTHER PUBLICATIONS

Notice of Preliminary Rejection from Korean Patent Application No. 10-2009-94711, dated Mar. 11, 2011.
Office Action from Chinese Patent Application No. 200810161685.2, dated Oct. 10, 2011.
Notice of Reasons for Rejection from Japanese Patent Application No. 2009-217020, dated Dec. 6, 2011.
Notice of Allowance from Korean Patent Application No. 10-2009-0094711, dated Nov. 15, 2011.

* cited by examiner

*Primary Examiner* — John H Le
(74) *Attorney, Agent, or Firm* — Zilka-Kotab, PC

(57) ABSTRACT

A media capture system, method, and computer program product are provided for assessing processing capabilities utilizing cascaded memories. In use, media data is captured from a system in accordance with predetermined criteria. Additionally, the media data is stored in a plurality of cascaded memories separate from the system. Further, the media data is used for assessing media processing capabilities of the system, based on the predetermined criteria.

24 Claims, 7 Drawing Sheets

MEDIA CAPTURE SYSTEM, METHOD, AND COMPUTER PROGRAM PRODUCT FOR ASSESSING PROCESSING CAPABILITIES UTILIZING CASCADED MEMORIES

The present application claims the priority of a Chinese patent application filed Oct. 6, 2008 under application number 200810161685.2, which is incorporated herein by reference.

FIELD OF THE INVENTION

The present invention relates to benchmarking, and more particularly to benchmarking various processing capabilities.

BACKGROUND

Benchmarking typically refers to a test used to compare various aspects of computer-related hardware and/or software. Trade magazines and other organizations have developed various benchmark tests, which may be used when reviewing a class of products. One particular type of benchmarking is three-dimensional graphics benchmarking which tests different aspects of a graphics processor and, in particular, the manner in which the graphics processor processes graphics information. Another particular type of benchmarking is video benchmarking. Video benchmarking tests different aspects of a graphics processor and, in particular, the manner in which the graphics processor processes video, performs encoding/decoding (e.g. compression/decompression), etc.

During conventional benchmarking, media data (e.g. video, etc.) may be displayed utilizing a system display and a user may manually inspect the media data on the display to determine whether hardware processing capabilities of the system meet certain benchmarks. For example, an ordinary user may attempt to detect dropped frames, visual artifacts, etc. during such assessment.

Unfortunately, it is difficult for ordinary users to efficiently and accurately perform an assessment of media processing capabilities (e.g. media processing quality assessment) of a system via a manual inspection. For example, users may be ineffective at, or even incapable of, detecting dropped frames, visual artifacts, etc. for quality assessment purposes, etc. Further, system resources are typically insufficient to automate such assessment process (e.g. there is not enough bandwidth, etc. to decode and capture the media within the system performing the test while monitoring itself and running the test). There is thus a need for addressing these and/or other issues associated with the prior art.

SUMMARY

A media capture system, method, and computer program product are provided for assessing processing capabilities utilizing cascaded memories. In use, media data is captured from a system in accordance with predetermined criteria. Additionally, the media data is stored in a plurality of cascaded memories separate from the system. Further, the media data is used for assessing media processing capabilities of the system, based on the predetermined criteria.

DETAILED DESCRIPTION

Figure 1:
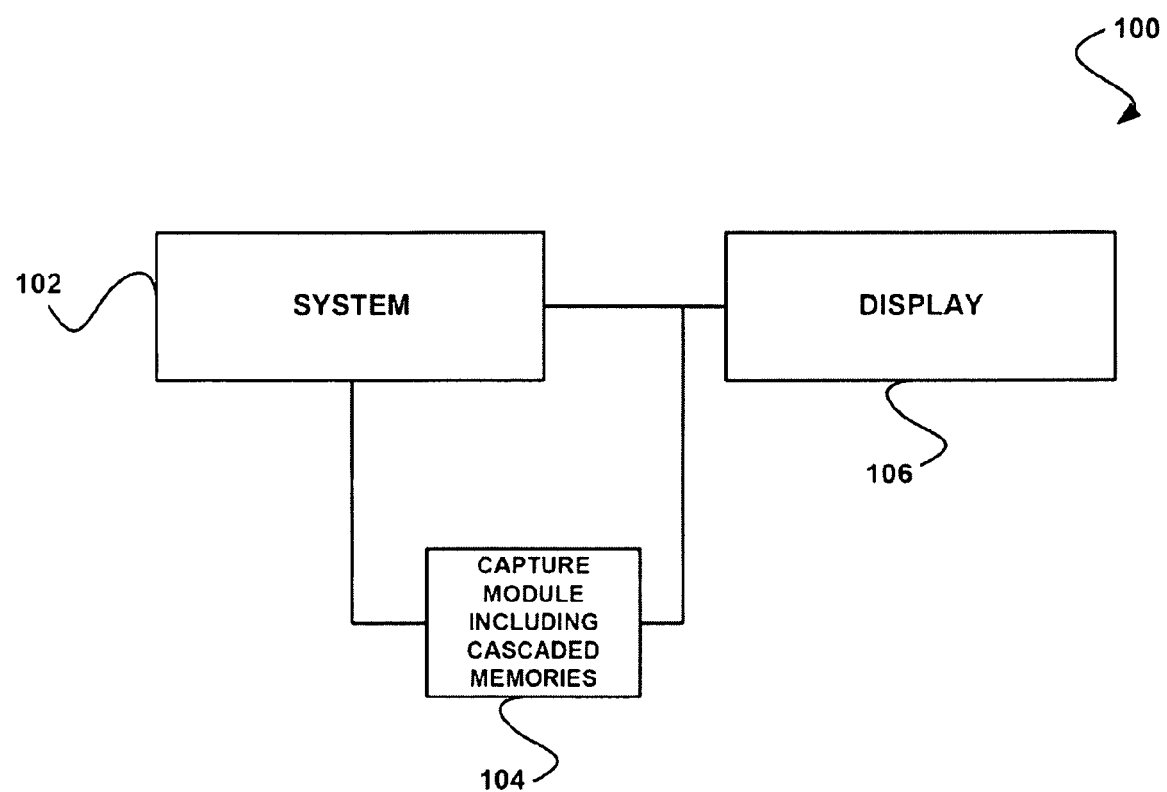
FIG. 1 shows a media capture system for assessing processing capabilities utilizing cascaded memories, in accordance with one embodiment.

FIG. 1 shows a media capture method for assessing processing capabilities utilizing cascaded memories, in accordance with one embodiment. As shown, a system 102 is in communication with (e.g. coupled to, etc.) a display 106. With respect to the present embodiment, the system 102 may include any system from which media data may be captured. For example, in various embodiments, the system 102 may include a client computer, a server computer, a mobile device, etc.

Additionally, the media data may include graphics data, in one embodiment. Such graphics data may include at least one pixel of an image displayed via the display 106. For example, the image may include a plurality of pixels. In another embodiment, the media data may include video data, such as at least one pixel of video displayed via the display 106.

In yet another embodiment, the media data may include audio data. Just by way of example, the audio data may include any audio output via the system 102. Of course, it should be noted that the media data may be associated with any type of media (analog and/or digital) capable of being captured from the system 102.

Further, the system 102 may be in communication with the display 106 for displaying the media data via the display 106. For example, the system 102 may communicate the media data to the display 106 for display thereof. The display 106 may include a computer monitor, a television, and/or any other display capable of displaying media data received from the system 102.

As an option, the system 102 may process the media data prior to displaying the media data via the display 106. Various examples of such processing will be described in more detail below. Accordingly, the system 102 may include a processor for performing such media data processing.

As also shown, a capture module including cascaded memories 104 is in communication with the system 102. In particular, the capture module including the cascaded memories 104 is separate from the system 102. The capture module including the cascaded memories 104 may include a device with a processor and the cascaded memories, or as another option may only include cascaded memories external to the system 102. As yet another option, the capture module including the cascaded memories 104 may be removably connected to the system 102.

In one embodiment, the capture module including the cascaded memories 104 may capture the media data from the system 102, in accordance with predetermined criteria. For example, the capture module including the cascaded memories 104 may capture the media data after processing of the media data by the system 102. Optionally, the capture module including the cascaded memories 104 may capture media data via an interface (e.g. DVI, HDMI, etc.) of the system 102. As another option, such interface may be in direct communication with the processor of the system 102 for allowing the capture module including the cascaded memories 104 to capture the media data from system 102 in any desired manner. As yet another option, the capture module including the cascaded memories 104 may capture the media data in real-time.

It should be noted that the predetermined criteria based on which the media data is captured may include any desired criteria that is predetermined. For example, the predetermined criteria may include a pixel mask. The pixel mask may indicate a frame, pixels, etc. of the media data to be captured. Thus, just by way of example, only the media data indicated by the pixel mask may be captured. In another embodiment, the predetermined criteria may be used as a benchmark, a calibration, etc.

Furthermore, the media data may be captured in any desired manner. In various embodiments, capturing the media data may include receiving, retrieving, etc. the media data from the system 102. In one embodiment, the media data may be captured utilizing an interface. Such interface may include a digital visual interface (DVI), a high definition multimedia interface (HDMI), etc. Thus, the interface may be in communication with a processor [e.g. graphics processor, graphics processing unit (GPU), a central processing unit (CPU), audio processor, video processor, etc.] of the system 102 for capturing the media data after being processed by such processor.

To this end, media data to be displayed, presented, output, etc. utilizing the system 102 may be captured. As another option, the media data may be captured in real-time. For example, the media data may be captured as the media data is output from the processor (e.g. to an output device, etc.).

In another embodiment, the capture module including the cascaded memories 104 may store the captured media data in the cascaded memories. For example, the capture module including the cascaded memories 104 may store the captured media in cascaded memories of the capture module 104. In this way, the media data captured from the system 102 may be stored in cascaded memories separate from the system 102.

With respect to the present embodiment, the cascaded memories of the capture module 104 may include any desired type of memories that are cascaded. For example, the cascaded memories may include non-volatile memory (e.g. flash memory, etc.), dynamic random access memory (DRAM), etc. Further, such memories may optionally be cascaded such that media data is only stored in a second memory upon a first memory being full with stored media data, is only stored in a third memory upon the second memory being full with stored media data, and so forth. To this end, at least one of the cascaded memories (e.g. the second, third, etc.) may include a slave and at least one of the cascaded memories (e.g. the first) may include a master.

Of course, however, the memories may be cascaded in any desired manner in which storage of the media data in the memories is controlled based on a cascading (e.g. ordering, etc.) of such memories. In on embodiment, synchronization commands may be utilized for controlling storage of the media data among the cascaded memories of the capture module 104. Such synchronization commands may indicate when one of the cascaded memories is full, and thus when the media data is to be stored in another one of the cascaded memories, for example.

As an option, the media data may be stored in the cascaded memories of the capture module 104 utilizing a memory controller. Moreover, the cascaded memories of the capture module 104 and the memory controller may be integrated on a single chip. Thus, the capture module including the cascaded memories 104 may optionally include a single chip with the cascaded memories and the memory controller located thereon. In one embodiment, the single chip may include a field programmable gate array (FPGA).

Furthermore, the media data is used for assessing the media processing capabilities (e.g. media processing quality assessment) of the system 102, based on the predetermined criteria. For example, only the media data captured in accordance with the predetermined criteria may be utilized for assessing the media processing capabilities of the system 102. It should be noted that the media data may be used by any desired other system, device, etc. for assessing the media processing capabilities of the system 102 (e.g. the system 102 under test). For example, the media data may be fed by the capture module 104 to any system, device, etc. for assessing the media processing capabilities of the system 102.

In one embodiment, the capture module including the cascaded memories 104 may optionally feed the media data back to the system 102 for assessing media processing capabilities of the system 102. The media data may be fed back to the system 102 via an interface (e.g. of the system 102), such as a USB interface, for example. Optionally, the capture module 104 may feed the media data back to the system 102 in non-real time or real-time. In this way, the capture module including the cascaded memories 104 may store the media data in the cascaded memories for a temporary time period (e.g. until requested by the system 202 for assessing media processing capabilities of the system 102, for a predetermined period of time, etc.).

Thus, as an option, in response to receiving the media data from the capture module including the cascaded memories 104, the system 102 may assess the media processing capabilities of the system 102. For example, the system 102 may utilize the media data fed back from the capture module including the cascaded memories 104 for assessing the media processing capabilities of the system 102. Accordingly, the assessment may provide information on the media processing of the media data by the system 102, as an option.

Moreover, the media processing capabilities assessment may include any evaluation, analysis, etc. of capabilities of the system 102 in processing media data. For example, the media processing capabilities assessment may assess the capabilities of the system 102 in processing the media data fed back to the system 102. In one embodiment, the assessment performed by the system 102 may involve an algorithm performed by the system 102 (e.g. involving the media data, etc.).

In another possible embodiment, the assessment may include comparing the captured media data to a more ideal copy (e.g. a "golden" copy, an unprocessed copy of the media data, etc.) of the media data. Just by way of example, the media data may include a frame of video, and the assessment may include comparing the frame of video fed back from the capture module including the cascaded memories 104 with an associated golden copy of the frame of video. The comparison and/or algorithm may thus indicate the media processing capabilities of the system 102 (e.g. whether the media processing of the system 102 reduces a quality of the media data, drops the media data, causes problems with audio-video synchronization, etc.).

In various embodiments, the media processing capabilities assessment may involve gamma correction, motion, decompression, color space control, brightness, saturation, color temperature correction, sharpening, overlay processing, encoding, de-interlacing, up/down scaling, digital versatile disk (DVD) decoding, etc. In other embodiments, the media processing capabilities assessment may involve identifying a maximum rate (e.g. frequency, etc.) at which the media data is presented, output, etc., counting and/or analyzing frames of the media data that have been dropped, assessing the quality of the media data (e.g. quality of enhancement of the media data, bit error associated with processing of the media data, quality of decoding of the media data, quality of motion treatment of the media data, etc.), assessing a peak signal-to-noise ratio, assessing audio-video synchronization, etc.

It should be noted that the foregoing examples of media processing are set forth for illustrative purposes only and should not be construed as limiting in any manner. Of course, the media processing may involve any processing that involves any type of media data. For example, the media processing capabilities of the system 102 may include capabilities of any processor of the system 102, such as a graphics processor, video processor, audio processor, or combination thereof, etc.

As an option, the media data may further be used for calibration purposes. For example, the media data may be used for calibrating the system 102. Such calibration may chance the display of the media data, in one embodiment (e.g. by preventing dropping of frames of the media data, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
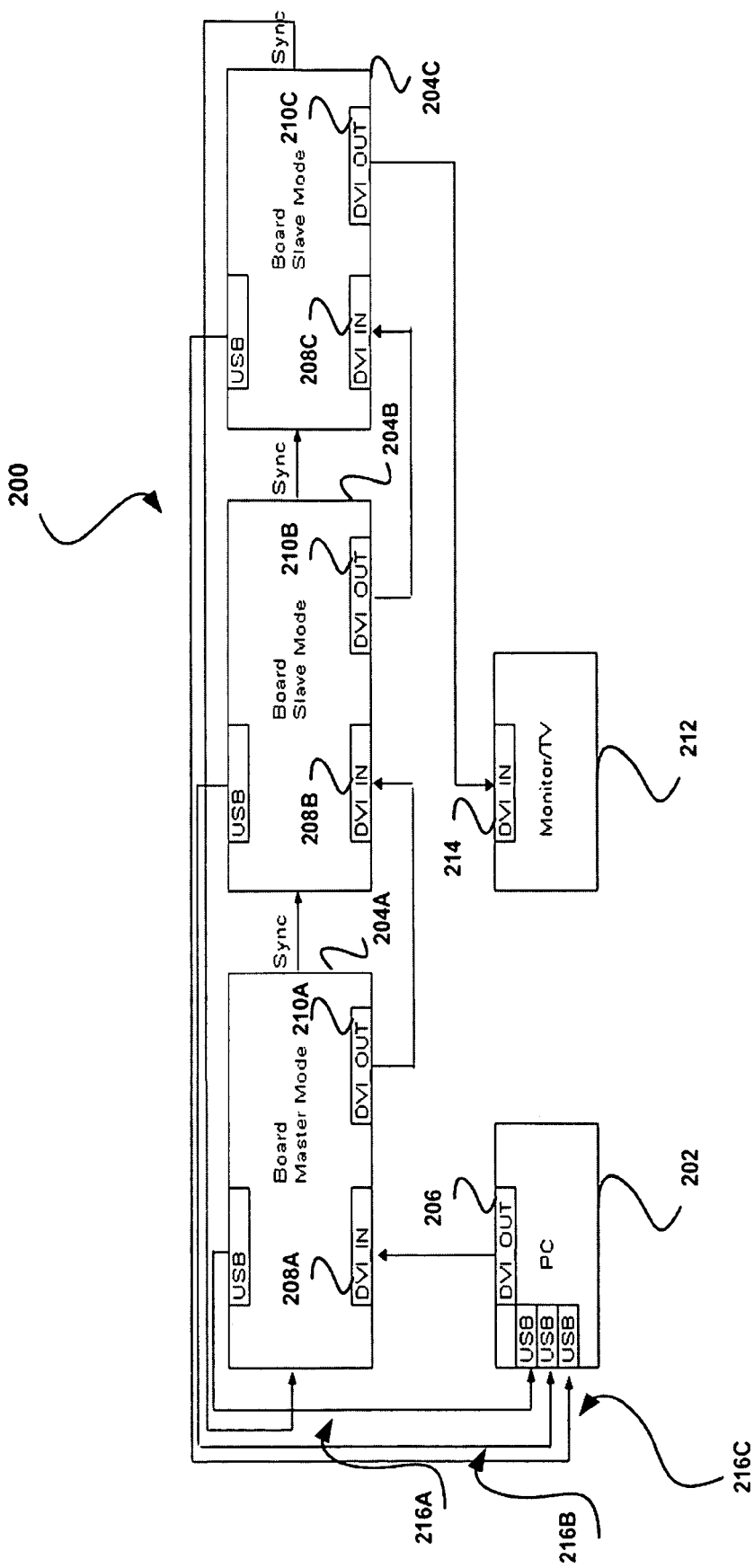
FIG. 2 shows a media capture system for assessing processing capabilities utilizing cascaded memories, in accordance with another embodiment.

FIG. 2 shows a media capture system 200 for assessing processing capabilities utilizing cascaded memories, in accordance with another embodiment. As an option, the media capture system 200 may be implemented in the context of the functionality and architecture of FIG. 1. Of course, however, the media capture system 200 may be implemented in any desired environment. It should also be noted that the aforementioned definitions may apply during the present description.

As shown, a computer system 202 is in communication with a first cascaded memory 204A of a plurality of cascaded memories 204A-C. The computer system 202 includes an output DVI 206 via which media data is output. Thus, as shown, the first cascaded memory 202A may capture the media data output from the output DVI 206 of the computer system 202.

In one embodiment, each of the cascaded memories 204A-C may be associated with an input DVI 208A-C. As an option, the cascaded memories 204A-C may capture media data via such input DVI 208A-C. For example, the first cascaded memory 204A may capture the media data output from the output DVI 206 of the computer system 202 utilizing the input DVI 208A associated with the first memory 204A. The first cascaded memory 204A may accordingly store the media data therein, until the first cascaded memory 204A is full. During capture of the media data and storage of the media data by the first cascaded memory 204A, the first cascaded memory 204A may include a master (e.g. may be in a master mode), and the remaining cascaded memories 204B-C may include slaves (e.g. may be in a slave mode).

Additionally, the first cascaded memory 204A is in communication with a second cascaded memory 204B. In one embodiment, the communication may include transmitting a synchronization signal. As an option, the synchronization signal may be utilized for issuing a synchronization command from the first cascaded memory 204A to the second cascaded memory 204B. For example, such synchronization command may indicate when the first cascaded memory 204A is full with stored media data captured from the computer system 202. As another example, the synchronization command may indicate an ending portion of the media data that was stored in the first cascaded memory 204A, for further indicating to the second cascaded memory 204B that the second cascaded memory 204B is to begin storing the media data starting at a portion of the media data following the ending portion of the media data stored by the first cascaded memory 204A.

In another embodiment, the communication may include transmitting media data captured from the computer system 202. Optionally, all of the media data captured from the computer system 202 may be transmitted from the first cascaded memory 204A to the second cascaded memory 204B.

Further, the first cascaded memory 204A may transmit the media data from an output DVI 210A of the first cascaded memory 204A to the input DVI 208B of the second cascaded memory 204B. To this end, upon receipt of the media data from the first cascaded memory 204A, and optionally also in response to receipt of the synchronization signal, the second cascaded memory 204B may store the received media data until the second cascaded memory 204B is full. During receipt of the media data and storage of the media data by the second cascaded memory 204B, the second cascaded memory 204B may include a master (e.g. may be in a master mode), and the remaining cascaded memories 204A and C may include slaves (e.g. may be in a slave mode).

Still yet, the second cascaded memory 204B is in communication with a third cascaded memory 204C. In one embodiment, the communication may include transmitting a synchronization signal. For example, such synchronization command may indicate when the second cascaded memory 204B is full with stored media data received from the first cascaded memory 204A. As another example, the synchronization command may indicate an ending portion of the media data that was stored in the second cascaded memory 204B, for further indicating to the third cascaded memory 204C that the third cascaded memory 204C is to begin storing the media data starting at a portion of the media data following the ending portion of the media data stored by the second cascaded memory 204B.

In another embodiment, the communication may include transmitting media data received from the first cascaded memory 204A. Optionally, all of the media data received by the second cascaded memory 204B (e.g. all of the media data captured from the computer system 202 by the first cascaded memory 204A) may be transmitted from the second cascaded memory 204B to the third cascaded memory 204C.

Furthermore, the second cascaded memory 204B may transmit the media data from an output DVI 210B of the second cascaded memory 204B to the input DVI 208C of the third cascaded memory 204C. To this end, upon receipt of the media data from the second cascaded memory 204B, and optionally also in response to receipt of the synchronization signal, the third cascaded memory 204C may store the received media data until the third cascaded memory 204C is full. During receipt of the media data and storage of the media data by the third cascaded memory 204C, the third cascaded memory 204C may include a master (e.g. may be in a master mode), and the remaining cascaded memories 204A-B may include slaves (e.g. may be in a slave mode).

Accordingly, in one embodiment, the first cascaded memory 204A may store a first portion of the media data until the first cascaded memory 204A is full. Once the first cascaded memory 204A is full, the second cascaded memory 204B may store a second portion of the media data that is subsequent to the first portion until the second cascaded memory 204B is full. The second cascaded memory 204B may store the second portion of the media data from the output DVI 210A of the first cascaded memory 204A. Once the second cascaded memory 204B is full, the third cascaded memory 204C may store a third portion of the media data that is subsequent to the second portion until the third cascaded memory 204C is full. The third cascaded memory 204C may store the third portion of the media data from the output DVI 210B of the second cascaded memory 204B. Similarly, any further cascaded memories 204 may each be filled until full via an output DVI 210 of a previous cascaded memory 204 (e.g. a last filled cascaded memory 204).

Moreover, the third cascaded memory 204C may transmit the media data received from the second cascaded memory 204B to a display 212. For example, the media data may be transmitted from an output DVI 210C of the third cascaded memory 204C to an input DVI 214 of the display 212. Opportunistically, any content oil the output DVI 210, when being sent to memory, can also be simultaneously sent to the display 212.

In addition, once full, a synchronization signal may be transmitted from the third cascaded memory 204C to the first cascaded memory 204A indicating that the third cascaded memory 204C is full with stored media data. As an option, the synchronization command may indicate an ending portion of the media data that was stored in the third cascaded memory 204C, for further indicating to the first cascaded memory 204A that the first cascaded memory 204A is to begin storing the media data starting at a portion of the media data following the ending portion of the media data stored by the third cascaded memory 204C.

Furthermore, the media data may also be transmitted from the third cascaded memory 204C to the first cascaded memory 204A. As an option, the first cascaded memory 204A may write over the media data stored therein with additional media. To this end, the cascaded memories 204A-C may store media data captured from the computer system 202 in a round-robin manner.

If the third cascaded memory 204C has stored a last portion of the media data, the synchronization signal transmitted from the third cascaded memory 204C to the first cascaded memory 204A may indicate such. As another option, the third cascaded memory 204C may send a capture finished command to the computer system 202. It should be noted that while only three cascaded memories 204A-C are shown, any number of cascaded memories may be utilized for storing media data captured from the computer system 202.

As also shown, each of the cascaded memories 204A-C are in communication with the computer system 202. For example, each of the cascaded memories 204A-C may be in communication with the computer system 202 via dedicated USB connections 216A-C. For example, each of the cascaded memories 204A-C and the computer system 202 may include a USB interface (e.g. USB port) for allowing the cascaded memories 204A-C to feed the media data back to the computer system 202. Of course, however, the cascaded memories 204A-C may be in communication with the computer system 202 in any desired manner.

With respect to the present embodiment, the cascaded memories 204A-C may be in communication with the computer system 202 for feeding the media data stored therein back to the computer system 202. In response to receipt of the media data from the cascaded memories 204A-C, the computer system 202 may utilize the media for assessing media processing capabilities of the system 202.

Figure 3:
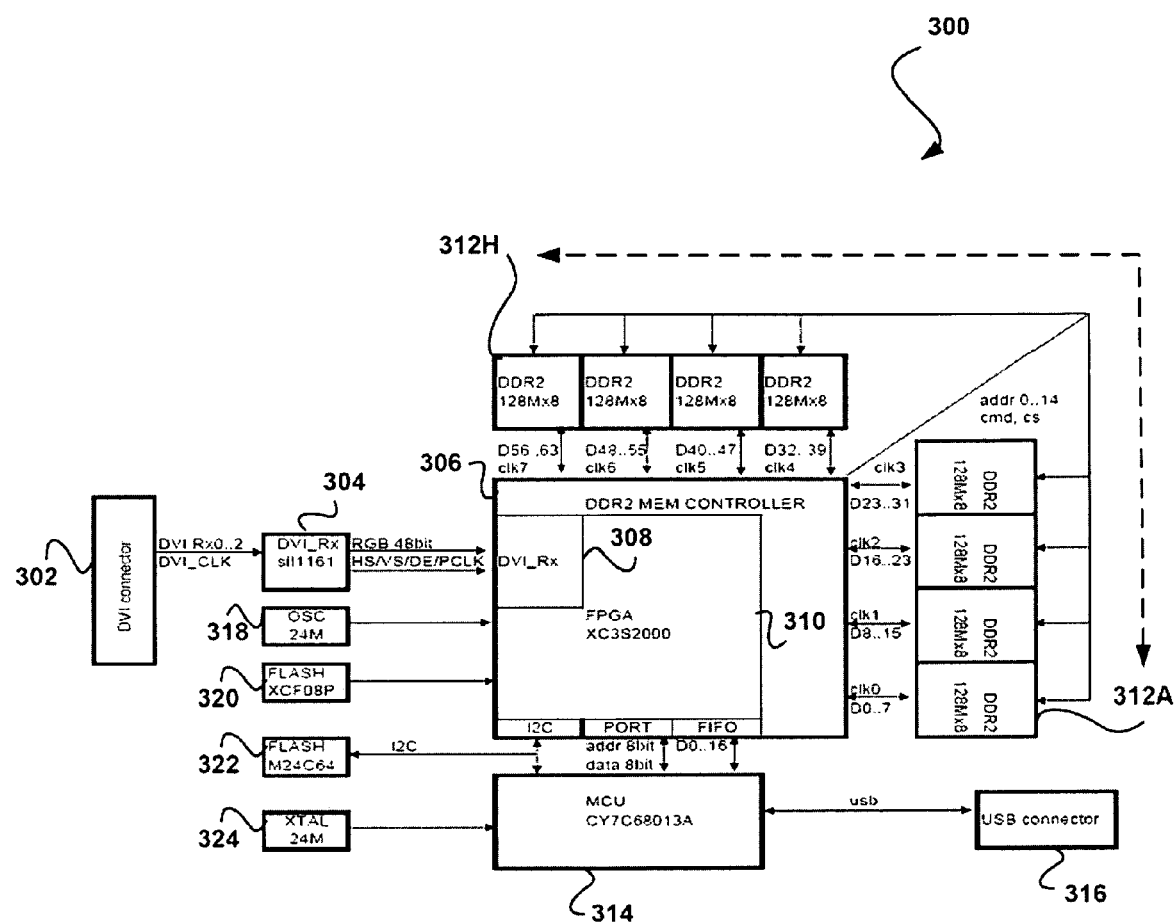
FIG. 3 shows a cascaded memory system for storing media data separate from another system from which the media data was captured, in accordance with yet another embodiment.

FIG. 3 shows a cascaded memory system 300 for storing media data separate from another system from which the media data was captured, in accordance with yet another embodiment. As an option, the cascaded memory system 300 may be implemented in the context of the functionality and architecture of FIGS. 1-2. For example, the cascaded memory system 300 may be implemented in the context of each of the cascading memories 204A-C of FIG. 2. Of course, however, the cascaded memory system 300 may be implemented in any desired environment. Again, it should be noted that the aforementioned definitions may apply during the present description.

As shown, the cascaded memory system 300 includes a DVI connector 302. With respect to the present embodiment, the DVI connector 302 may be in communication with a remote system (not shown) separate from the cascaded memory system 300. For example, the DVI connector 302 may be in communication with the remote system for capturing media data from such remote system.

Upon receipt of the media data by the DVI connector 302, the DVI connector 302 may transmit the media data to a DVI receiver 304 (e.g. Silicon Image Sill 161). The DVI receiver 304 may interface the DVI connector 302 and a memory controller 306 of the cascaded memory system 300. To this end, the DVI receiver 304 may transmit the media data captured from the remote system to the memory controller 306. As an option, the DVI receiver 304 may transmit the media data captured from the remote system to a DVI receiver 308 of the memory controller 306.

In response to receipt of the media data by the memory controller 306, the memory controller 306 may store the media data in memory 312A-H. For example, a FPGA 310 of the memory controller 306 may store the media data in the memory 312A-H.

As shown, the memory 312A-H may optionally include double-data-rate two synchronous dynamic random access memory (DDR2 SDRAM). Just by way of example, the memory 312A-H may include a plurality of DDR2 SDRAM modules (e.g. 8 pieces of 128×8 DDR2 SDRAM modules, thus totaling 1 gigabyte of memory for the cascaded memory system 300). To this end, a high DVI data rate may optionally be provided. For example, with 1600×1200×60 resolution for the media data, a pixel clock may be 162 megahertz, and the data rate may be (3×162) 486 megabytes per second. Thus, using the DDR2 SDRAM memory, and to balance cost and capacity of such memory, the FPGA 310 (e.g. Xilinx SPARTAN-3 XC3S2000) may implement a 64 bit DDR2 memory interface for interfacing the DDR2 SDRAM memory.

As an option, the media data captured from the remote system may be filtered by the cascaded memory system 300. Such filtering may allow the memory controller 306 to store only a portion of the media data captured from the remote system in the memory 312A-H. Just by way of example, the portion may include a subset of pixels of each of a plurality of frames of the media data.

In one embodiment, the media data may be filtered by the FPGA 310. In another embodiment, the portion of the media data filtered for storage thereof in the memory 312A-H may be selected utilizing a controller, such as the FPGA 310. As an option, the controller may be controlled by the remote system, such as via a USB connector 316 interfacing the remote system and the cascaded memory system 300 by way of a microcontroller 314.

In yet another embodiment, the media data may be filtered based on a pixel mask indicated by the remote system. Such pixel mask may indicate the portion of the media data to be stored in the memory 312A-H. For example, the pixel mask may indicate a start time or a start frame of the media data indicative of a starting frame of the portion of the media data to be stored, a start line at such start time or start frame indicative of a starting line of die media data to be stored, a start pixel at such start line indicative of a starting pixel of the media data to be stored, an end time or an end frame of the media data indicative of an ending frame of the portion of the media data to be stored, an end line at such end time or end frame indicative of an ending line of the media data to be stored, an end pixel at such end line indicative of an ending pixel of the media data to be stored, etc. As an option, the pixel may be provided via a plurality of command and control bits (e.g. pixel mask enable, pixel mask, capture pixels range start time/frame, capture pixels range start line, capture pixels range start pixel, capture pixels range end time/frame, capture pixels range end line, capture pixels range end pixel, etc.).

Furthermore, after temporarily storing the media data (e.g. the filtered media data) in the memories 312A-H, the cascaded memory system 300 may feed the stored media data back to the remote system. In one embodiment, the FPGA 310 may feed the stored media data to a microcontroller 314 (e.g. Cypress CY7C68013A) of the cascaded memory system 300. The microcontroller 314 may communicate with the USB connector 316 for transmitting the stored media data thereto.

To this end, the USB connector 316 may have a USB connection to the remote system for feeding the stored media data back to the system. As also shown, the cascaded memory system 300 may also include a plurality of other components 318-324. Such other components may include flash memory, processors, etc.

Figure 4:
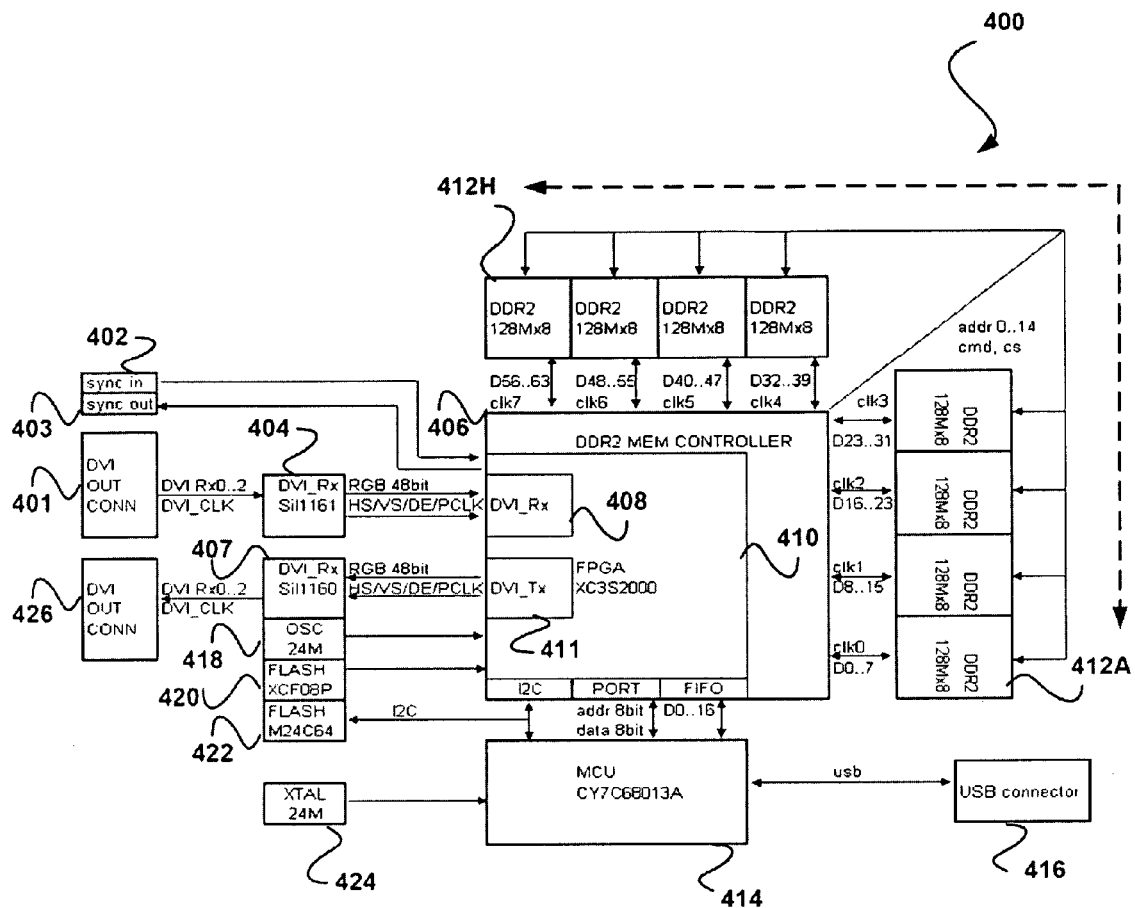
FIG. 4 shows a cascaded memory system for storing media data separate from another system from which the media data was captured based on a synchronization signal, in accordance with still yet another embodiment.

FIG. 4 shows a cascaded memory system 400 for storing media data separate from another system from which the media data was captured based on a synchronization signal, in accordance with still yet another embodiment. As an option, the cascaded memory system 400 may be implemented in the context of the functionality and architecture of FIGS. 1-3. For example, the cascaded memory system 400 may be implemented in the context of each of the cascading memories 204A-C of FIG. 2. Of course, however, the cascaded memory system 400 may be implemented in any desired environment. Again, it should be noted that the aforementioned definitions may apply during the present description.

As shown, the cascaded memory system 400 includes an input DVI connector 401. In one embodiment, the input DVI connector 401 may be in communication with a remote system (not shown) separate from the cascaded memory system 400. For example, the input DVI connector 401 may be in communication with the remote system for capturing media data from such remote system.

As an option, the input DVI connector 401 may only capture the media data from the remote system, based on a synchronization signal. For example, the input DVI connector 401 may only capture the media data from the remote system in response to receipt of an input synchronization signal 402 (e.g. received from the remote system for requesting an initial capturing of the media data). The input synchronization signal 402 may be received by the memory controller 406 described below, such that the memory controller 406 may instruct the input DVI 401 via the DVI receiver 404 to begin capture of the media data from the remote system. As an option, the input synchronization signal 402 may include a start capture command for commanding the cascaded memory system 400 to start capturing of the media data from the remote system.

In another embodiment, the input DVI connector 401 may be in communication with another cascaded memory system. For example, the input DVI connector 401 may be in communication with the other cascaded memory system for receiving media data from such other cascaded memory system. As an option, the input DVI connector 401 may only receive the media data from the other cascaded memory system, based on a synchronization signal.

For example, the input DVI connector 401 may only receive the media data from the other cascaded memory system in response to receipt of an input synchronization signal 402 (e.g. received from the other cascaded memory system in response to the other cascaded memory system being full from storage of a portion of the media data). The input synchronization signal 402 may be received by the memory controller 406 described below, such that the memory controller 406 may instruct the input DVI 401 via the DVI receiver 404 to begin receipt of the media data from the other cascaded memory system. As an option, the synchronization signal may indicate a starting portion of the media data to be stored by the cascaded memory system 400.

Upon receipt of the media data by the input DVI connector 401, the input DVI connector 401 may transmit the media data to a DVI receiver 404 (e.g. Silicon Image Sill 161). The DVI receiver 404 may interface the input DVI connector 401 and a memory controller 406 of the cascaded memory system 400. To this end, the DVI receiver 404 may transmit the media data to the memory controller 406. As an option, the DVI receiver 404 may transmit the media data to a DVI receiver 408 of the memory controller 406.

In response to receipt of the media data by the memory controller 406, the memory controller 406 may store the media data in memory 412A-H. For example, a FPGA 410 of the memory controller 406 may store the media data in the memory 412A-H.

As shown, the memory 412A-H may optionally include double-data-rate two synchronous dynamic random access memory (DDR2 SDRAM). Just by way of example, the memory 412A-H may include a plurality of DDR2 SDRAM modules (e.g. 8 pieces of 128×8 DDR2 SDRAM modules, thus totaling 1 gigabyte of memory for the cascaded memory system 400). To this end, a high DVI data rate may optionally be provided. For example, with 1600×1200×60 resolution for the media data, a pixel clock may be 162 megahertz, and the data rate may be (3×162) 486 megabytes per second. Thus, using the DDR2 SDRAM memory, and to balance cost and capacity of such memory, the FPGA 410 (e.g. Xilinx SPARTAN-3 XC3S2000) may implement a 64 bit DDR2 memory interface for interfacing the DDR2 SDRAM memory.

As an option, the media data may be filtered by the cascaded memory system 400. Such filtering may allow the memory controller 406 to store only a portion of the media data in the memory 412A-H. Just by way of example, the portion may include a subset of pixels of each of a plurality of frames of the media data.

In one embodiment, the media data may be filtered by the FPGA 410. In another embodiment, the portion of the media data filtered for storage thereof in the memory 412A-H may be selected utilizing a controller, such as the FPGA 410. As an option, the controller may be controlled by the remote system, such as via a USB connector 416 interfacing the remote system and the cascaded memory system 400 by way of a microcontroller 414.

In yet another embodiment, the media data may be filtered based on a pixel mask indicated by the remote system. Such pixel mask may indicate the portion of the media data to be stored in the memory 412A-H For example, the pixel mask may indicate a start time or a start frame of the media data indicative of a starting frame of the portion of the media data to be stored, a start line at such start time or start frame indicative of a starting line of the media data to be stored, a start pixel at such start line indicative of a starting pixel of the media data to be stored, an end time or an end frame of the media data indicative of an ending frame of the portion of the media data to be stored, an end line at such end time or end frame indicative of an ending line of the media data to be stored, an end pixel at such end line indicative of an ending pixel of the media data to be stored, etc. As an option, the pixel may be provided via a plurality of command and control bits (e.g. pixel mask enable, pixel mask, capture pixels range start time/frame, capture pixels range start line, capture pixels range start pixel, capture pixels range end time/frame, capture pixels range end line, capture pixels range end pixel, etc.).

Once the memories 412A-H of the cascaded memory system 400 is full with stored media data, the cascaded memory system 400 may transmit an output synchronization signal 403, in one embodiment. The output synchronization signal 403 may be transmitted to a next cascaded memory system in communication with the cascaded memory system 400 shown, for example. The output synchronization signal 403 may indicate that the cascaded memory system 400 is full, and may further indicate an end portion of the media data stored by die cascaded memory system 400.

In addition, the cascaded memory system 400 may transmit the media data received via the input DVI connector 401 to such next cascaded memory system, via an output DVI connector 426. For example, the FPGA 410 may transmit the media data via a DVI transmitter 411 of the FPGA 410, which may in turn transmit the media data to DVI transmitter 407. Further, the DVI transmitter 407 may transmit the media data to the output DVI connector 426 for transmitting the media data to the next cascaded memory system.

Furthermore, after temporarily storing the media data (e.g. the filtered media data) in the memories 412A-H, the cascaded memory system 400 may transmit the stored media data back to the remote system. In one embodiment, die FPGA 410 may feed the stored media data to a microcontroller 414 (e.g. Cypress CY7C68013A) of the cascaded memory system 400. The microcontroller 414 may communicate with the USB connector 416 for transmitting the stored media data thereto.

To this end, the USB connector 416 may have a USB connection to the remote system for feeding the stored media data back to the system. As also shown, the cascaded memory system 400 may also include a plurality of other components 418-424. Such other components may include flash memory, processors, etc.

Figure 5A:
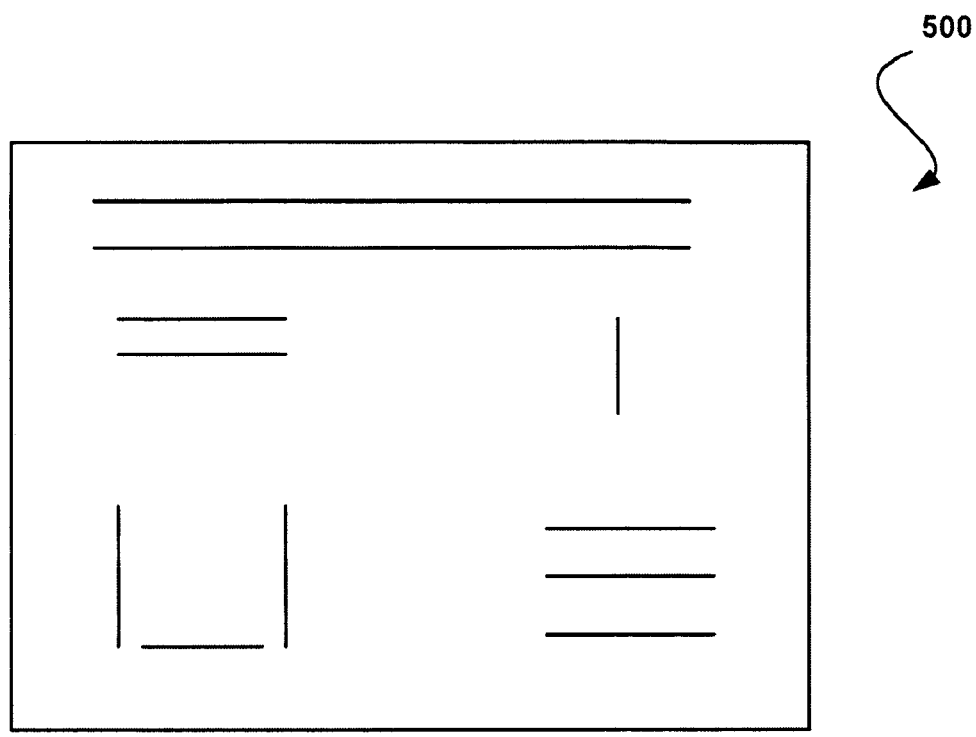
FIG. 5A shows a partial frame of media data, in accordance with another embodiment.

FIG. 5A shows a partial frame 500 of media data, in accordance with another embodiment. As an option, the frame 500 may be implemented in the context of the functionality and architecture of FIGS. 1-4. Of course, however, the frame 500 may be implemented in any desired environment. Again, it should be noted that the aforementioned definitions may apply during the present description.

In the context of the present embodiment, the partial frame 500 may include a partial frame of media data (e.g., a frame of video data, etc.) captured from a system. In the present embodiment, a portion of a frame (e.g. certain sequences of pixels, etc.) may be stored in the cascaded memory separate from such system. Further the partial frame 500 may be fed back to the system for assessing media processing capabilities of the system. Of course, in other embodiments, the entire frame may be captured and stored.

As shown, the partial frame 500 may include a plurality of horizontal and vertical sequences of pixels. Thus, each pixel within the partial frame 500 of media data may be captured. Such information may further be fed back to the system, as noted above, such that the system may assess media processing capabilities of the system, utilizing the pixels.

Figure 5B:
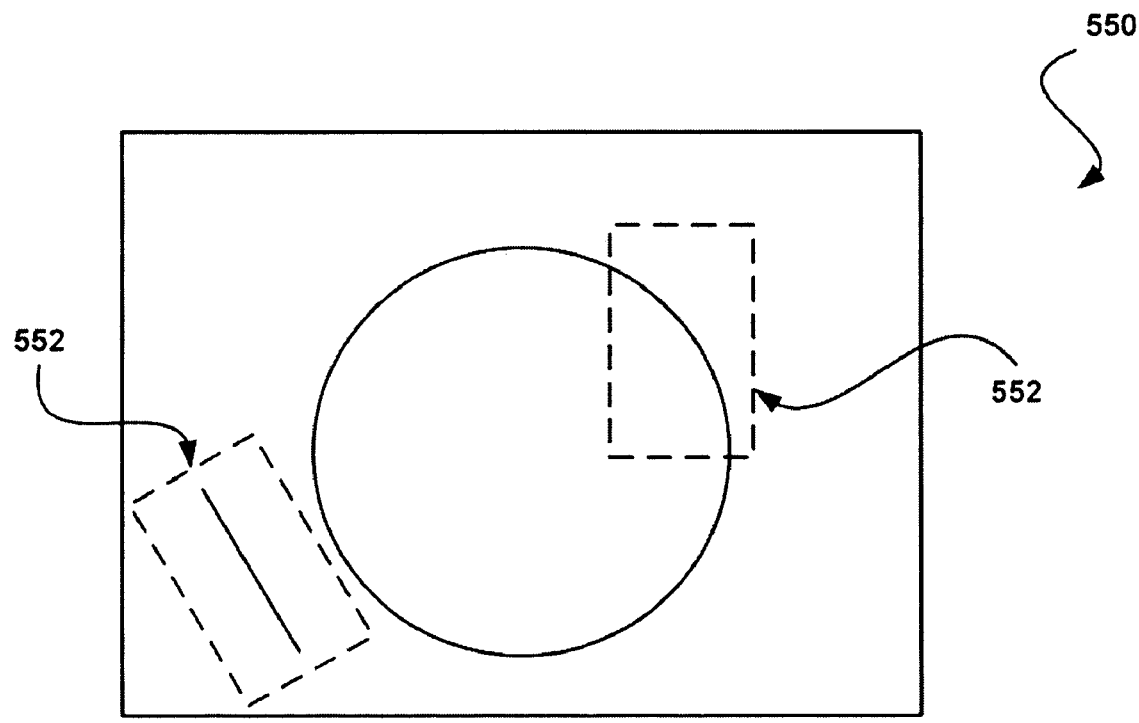
FIG. 5B shows a frame of media data from which a portion is stored, in accordance with yet another embodiment.

FIG. 5B shows a frame 550 of media data from which a portion is stored, in accordance with yet another embodiment. As an option, the frame 550 may be implemented in the context of the functionality and architecture of FIGS. 1-4. Of course, however, the frame 550 may be implemented in any desired environment. Again, it should be noted that the aforementioned definitions may apply during the present description.

In the context of the present embodiment, the frame 550 may include a frame of media data (e.g. a frame of video data, etc.) that is captured from a system. As shown, the frame 550 may include a plurality of pixels that form an image of a circle and a diagonal line outside of the circle. As an option, the image of the circle and/or the diagonal line may be scaled to a particular proportion.

As also shown, only a portion 552 of the frame 550 may be selected. The portion 552 may include any subset of the frame 550. For example, the portion 552 may include a subset of pixels included in the frame 550.

It should be noted that the portion 552 may be selected in any desired manner. In one embodiment, the portion 552 may be selected based on predetermined coordinates. For example, the predetermined coordinates may indicate pixels to be stored in memory. In another embodiment, the portion 552 may be identified utilizing a horizontal and vertical counter, pixel mask, frame counter, etc. In other embodiments involving audio media data, a wall clock, etc. may be used to identify the appropriate portion.

The selected portion 552 of the frame 550 may then be stored in cascaded memory separate from the system from which the frame 550 was captured. Storing only a selected portion 552 of the frame 550 may opportunistically limit the amount of memory consumption associated with storing captured media data, in one embodiment. Further, it may opportunistically require less processing power to achieve optimal bandwidth. Still yet, the portion 552 of the frame 550 may be fed back to the system from the memory for assessing media processing capabilities of such system. Feeding back only the portion 552 of the frame 550 may optionally limit such assessment to be based on such portion 552, thus opportunistically reducing resource consumption associated with the system in performing the assessment of the media processing capabilities of the system.

In one embodiment, software located on the system may communicate with a device via which the frame 550 is captured. The software may optionally dictate to the capturing device the portion 552 of the frame 550 to be selected for being captured. For example, the software may provide a pixel mask to the capturing device for indicating the portion 552 of the frame 550 to be captured. To this end, the system may assess the media processing capabilities thereof based on the portion 552 of the frame 550 that is captured.

Figure 6:
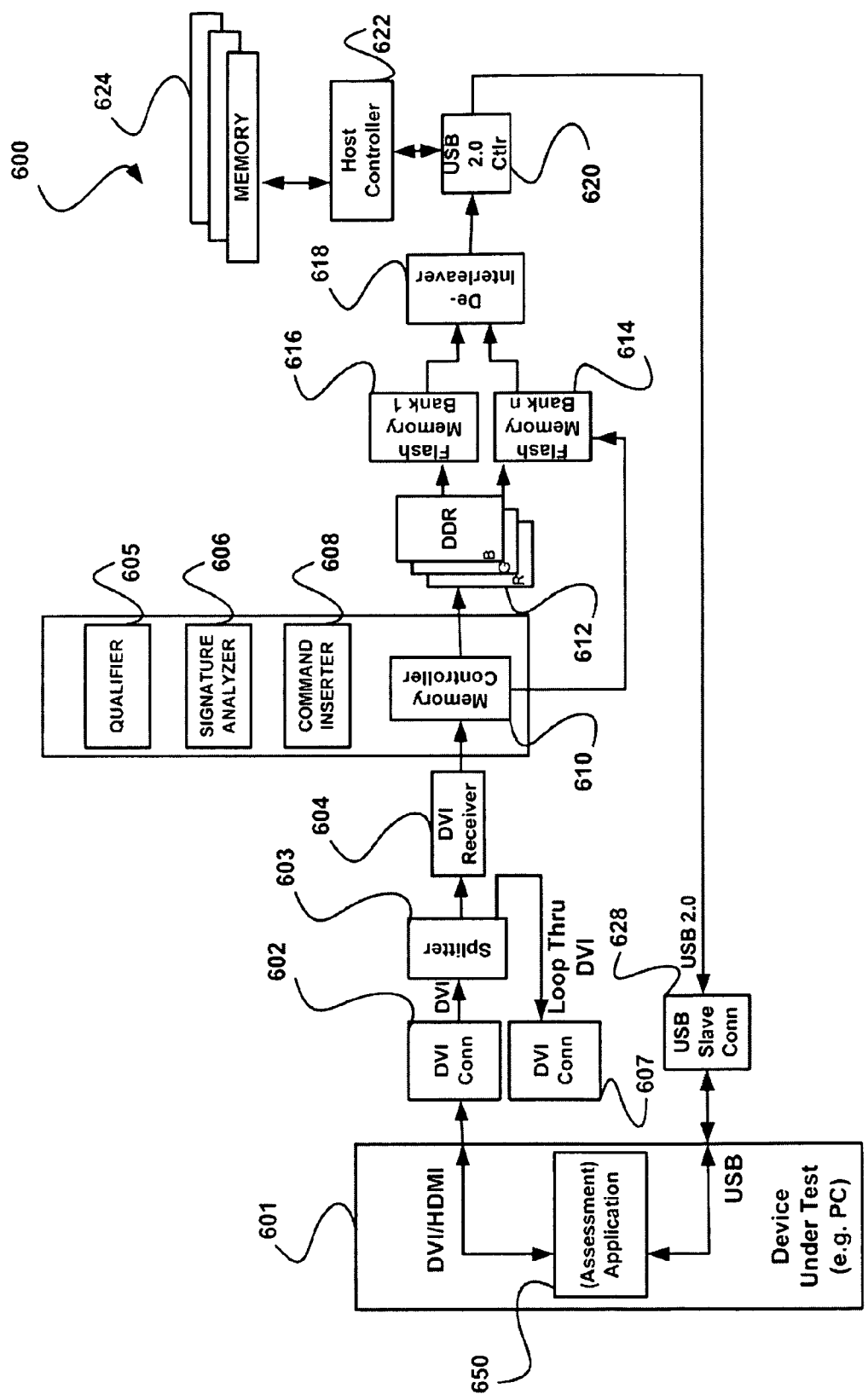
FIG. 6 shows a media capture system for assessing processing capabilities utilizing media data stored in cascaded memories separate from another system from which the media data was captured, in accordance with another embodiment.

FIG. 6 shows a media capture system 600 for assessing processing capabilities utilizing media data stored in cascaded memories separate from another system from which the media data was captured, in accordance with another embodiment. As an option, the media capture system 600 may be implemented in the context of the functionality and architecture of FIGS. 1-5. Of course, however, the media capture system 600 may be implemented in any desired environment. Again, the aforementioned definitions may apply during the present description.

As shown, media data (e.g. pixel data, audio data, image, etc.) is captured from an interface (e.g. DVI, HDMI, etc.) of a system 601. In particular, the media data is captured utilizing a DVI connection 602. Thus, generated or otherwise processed media data capable of being presented via the system 601 may be captured. The media data may be captured from an assessment application 650 of the system 601. For example, the assessment application 650 may generate the media data.

In addition, the captured media data is sent to a splitter 603. The splitter 603 may enable the media data to be both channeled to a DVI receiver 604 as well as to another DVI connection 607. The other DVI connection 607 may include a connection to other system components (e.g. a display, etc.).

Upon receipt of the media data, the DVI receiver 604 forwards the media data to a memory controller 610. The memory controller 610 may select only a portion of the media data for storage. For example, the memory controller 610 may select a portion based on a command incorporated in a content portion of the media data (e.g. via the command inserter 608). In addition, at least one signature of at least a portion of the media data may be generated utilizing a signature analyzer 606. The portion of the media data based on which the signature is generated may be selected by a qualifier 605, in one embodiment. For example, the qualifier 605 may receive a signal indicating which components of pixels received by the DVI receiver 604 are to be utilized for generating the signature.

In another embodiment, the memory controller 610 may send the media data, or any selected portion thereof, and optionally the signature generated for such media data, to double data rate (DDR) memory 612, or any other type of memory for that matter. For example, the DDR memory 612 may include multiple DDR memory portions. In one embodiment, each portion of the DDR memory 612 may store pixel data that is associated with a different color component.

Furthermore, the media data is sent from the DDR memory 612 to a plurality of flash memory banks 614 and 616. For example, the media data from the DDR memory 612 may be interleaved among the flash memory banks 614 and 616. As an option, the interleaving may be controlled by the memory controller 610.

Still yet, media data communicated from the flash memory banks 614 and 616 is de-interleaved utilizing a de-interleaver module 618. In this way, media data interleaved into the flash memory banks 614 and 616 may be de-interleaved. Such de-interleaving may include formatting the media data into the format in which the media data was captured from the system 601.

As also shown, a USB 2.0 controller 620 receives the de-interleaved media data from the de-interleaver module 618. In one embodiment, the USB 2.0 controller 620 may be used by an assessment application 650 to control the capturing of the media data from the system 601. For example, the USB 2.0 controller 620 may, under the control of the assessment application 650, instruct the DVI receiver 604, via a USB interface of the system 601, to receive media data from the system 601 during an indicated time period (e.g. a time period between a start time and stop time, etc.). Of course, other techniques are also contemplated for controlling the manner in which the media data is captured and stored (e.g. indicating a pixel structure, using a pixel mask for active pixels to be captured, etc.).

In use, the USB 2.0 controller 620 may communicate the media data to a host controller 622, which stores the media data in cascaded memory. As shown, the host controller 522 may write the media data to the cascaded memory 624.

Moreover, the host controller 622 may read the stored media data from the cascaded memory. In one embodiment, the host controller 622 may read the stored media data in response to an instruction from the assessment application 650 executed on the system 601. Optionally, such instruction may be received from the system 601 by the memory controller 622 via the USB interface of the system 601. Thus, the cascaded memory 624 may be used to temporarily store the media data.

After reading the stored media data from the cascaded memory 624, the host controller 622 communicates the media data to the USB 2.0 controller 620. The USB 2.0 controller 620 further communicates the media data back to the system 601 via a USB slave connection 628. Further, the assessment application 650 of the system 601 may receive the media data captured therefrom for use in assessing processing capabilities of such system 601.

For example, in various embodiments, different tests may be performed by the assessment application 650. In one embodiment, the assessment application 650 may determine whether each of a plurality of frames captured during a predetermined time period were, in fact, rendered. In another embodiment, visual values (e.g. color values, etc.) may be evaluated, etc. In yet another embodiment, the assessment application 650 may compare the received media data with a more ideal copy of the media data (e.g. golden copy, an unprocessed copy of the media data, etc.) for assessing processing capabilities of the system 601. Of course, such exemplary assessments are set forth for illustrative purposes only and should not be construed as limiting in any manner whatsoever.

Figure 7:
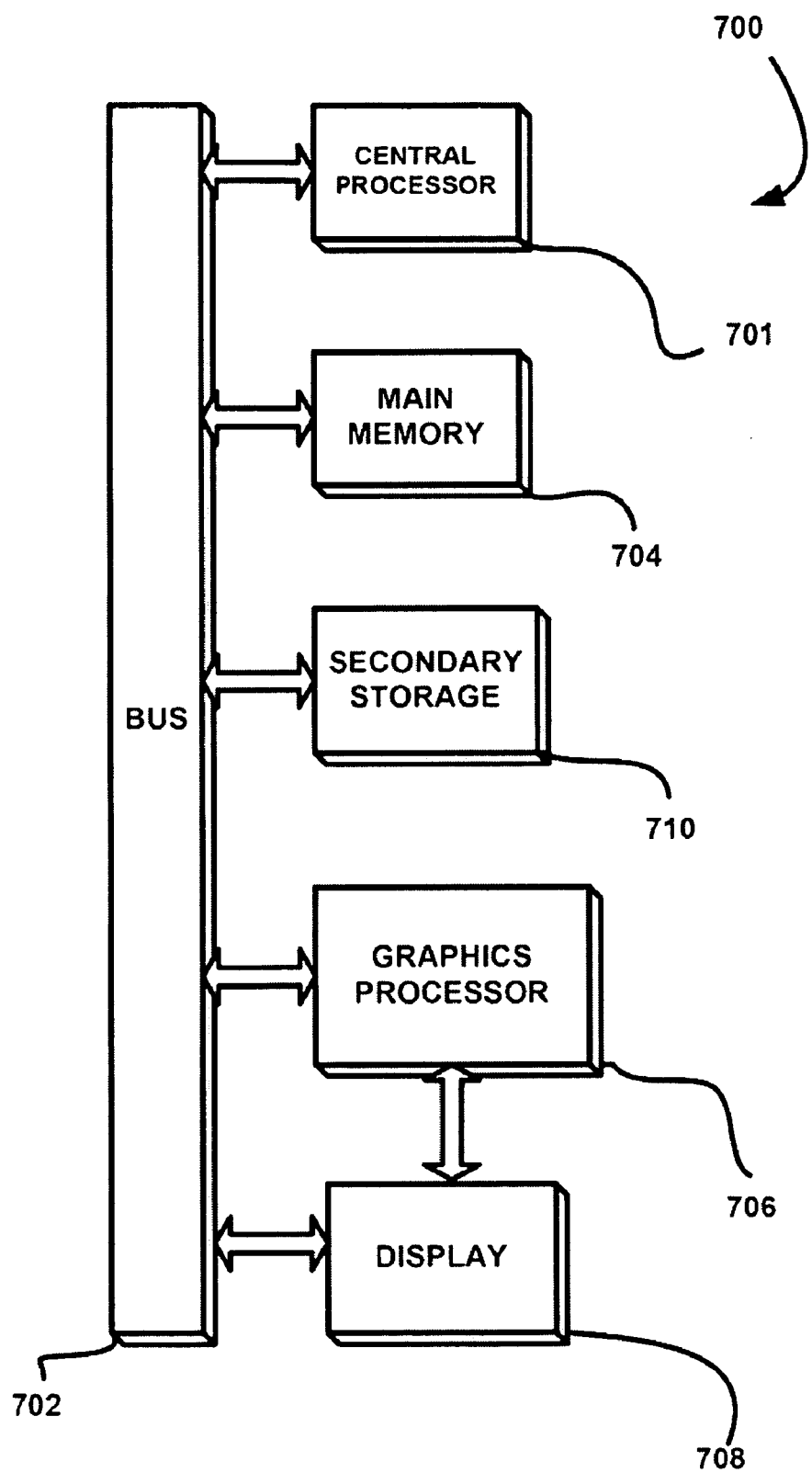
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to, a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    capturing processed media data from a system in accordance with criteria, where the system processes the media data;
    storing the processed media data in a plurality of cascaded memories separate from the system after the media data has been processed by the system, utilizing a processor; and
    using the processed media data for assessing media processing capabilities of the system, utilizing the criteria;
    wherein the criteria are used as a video benchmark.

2. The method of claim 1, wherein the media data includes at least one of graphics data, video data, and audio data.

3. The method of claim 1, wherein the processed media data is captured utilizing an interface including a digital visual interface (DVI).

4. The method of claim 1, wherein the cascaded memories include non-volatile memory.

5. The method of claim 4, wherein the processed media data is red in the cascaded memories utilizing a memory controller.

6. The method of claim 1, wherein the criteria are used as a calibration.

7. The method of claim 1, wherein the processed media data is fed back to the system.

8. The method of claim 1, wherein synchronization commands control storage of the processed media data among the cascaded memories.

9. The method of claim 1, wherein at least one of the cascaded memories includes a slave and at least one of cascaded memories includes a master.

10. The method of claim 1, wherein only a portion of the processed media data is stored.

11. The method of claim 10, wherein the portion of the processed media data is selected utilizing a controller.

12. The method of claim 11, wherein the controller is controlled by the system.

13. The method of claim 10, wherein the portion of the processed media data includes a subset of pixels of each of a plurality of frames.

14. The method of claim 1, wherein the processed media data is captured in real-time.

15. The method of claim 1, wherein the media processing capabilities of the system include capabilities of at least one of a graphics processor, a video processor, and an audio processor.

16. The method of claim 1, wherein the processed media data is captured according to a pixel mask dictated by software of the system.

17. The method of claim 16, wherein only the processed media data indicated by the pixel mask is captured.

18. The method of claim 1, wherein the memories are cascaded such that the processed media data is only stored in a second memory of the cascaded memories upon a first memory of the cascaded memories being full with stored media data.

19. The method of claim 1, wherein the media data is captured as the media data is output from the system to a display.

20. The method of claim 1, wherein the plurality of cascaded memories store the processed media data until requested by the system for assessing the media processing capabilities of the system.

21. A computer program product embodied on a non-transitory computer readable medium, executed by a computer processor, comprising:
    computer code for capturing processed media data from a system in accordance with criteria, where the system processes the media data;
    computer code for storing the processed media data in a plurality of cascaded memories separate from the system after the media data has been processed by the system; and
    computer code for using the processed media data for assessing media processing capabilities of the system, utilizing the criteria;
    wherein the computer program product is operable such that the criteria are used as a video benchmark.

22. An apparatus, comprising:
    a interface receiver for capturing processed media data from a system in accordance with criteria, where the system processes the media data; and
    a plurality of cascaded memories in communication with the interface receiver, the cascaded memories for storing the processed media data separate from the system after the media data has been processed by the system;
    wherein the apparatus is operable such that the processed media data is used for assessing media processing capabilities of the system, utilizing the criteria;
    wherein the system is operable such that the criteria are used as a video benchmark.

23. The apparatus of claim 22, wherein the apparatus is removably connected to the system.

24. The apparatus of claim 22, wherein the media processing capabilities of the system include capabilities of at least one of a graphics processor, a video processor, and an audio processor.

* * * * *

UNITED STATES PATENT AND TRADEMARK OFFICE
CERTIFICATE OF CORRECTION

PATENT NO.        : 8,195,432 B2                                    Page 1 of 1
APPLICATION NO.   : 12/274202
DATED             : June 5, 2012
INVENTOR(S)       : Herz et al.

It is certified that error appears in the above-identified patent and that said Letters Patent is hereby corrected as shown below:

On the Title Page:
        Foreign Application Priority Data, section (30); please replace "2008 1 0161685" with --200810161685.2--.

Signed and Sealed this
Nineteenth Day of March, 2013

Teresa Stanek Rea
*Acting Director of the United States Patent and Trademark Office*